J. C. LOTT.
GEAR CASING FOR MOTOR VEHICLES.
APPLICATION FILED JUNE 18, 1908.
935,036.
Patented Sept. 28, 1909.
2 SHEETS—SHEET 1.
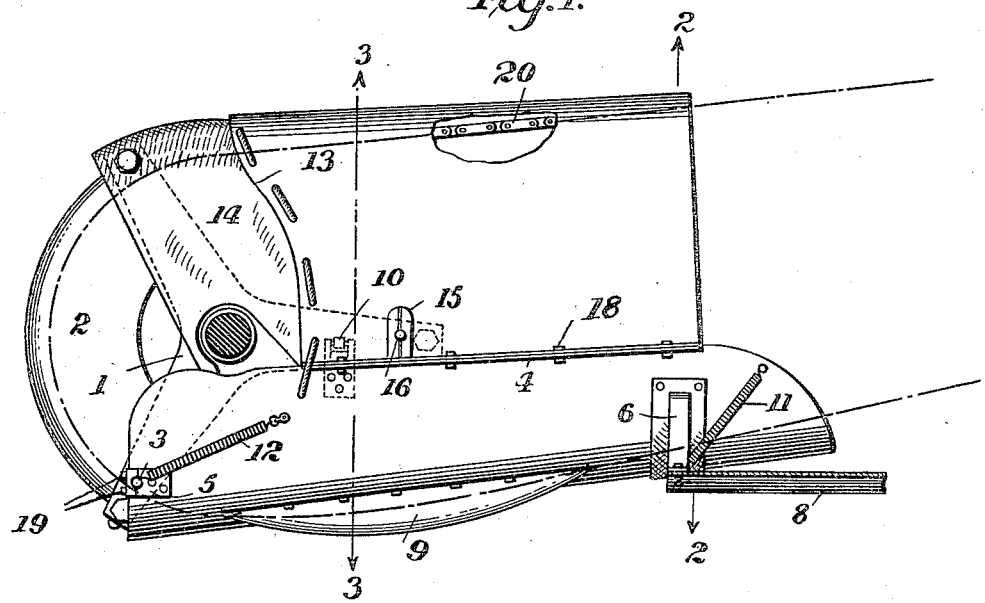
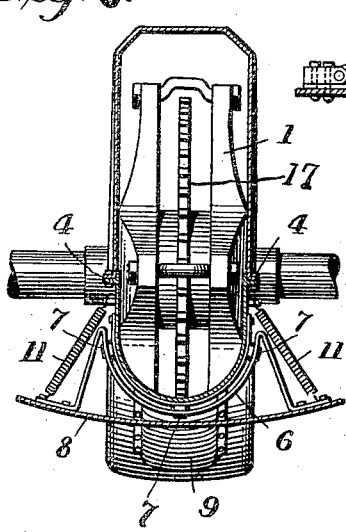
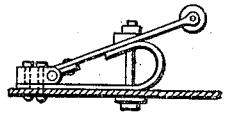
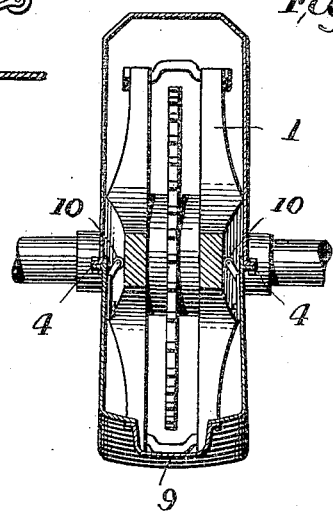
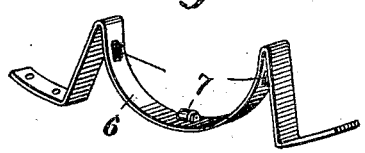
Witnesses
Inventor
John C. Lott
Attorney

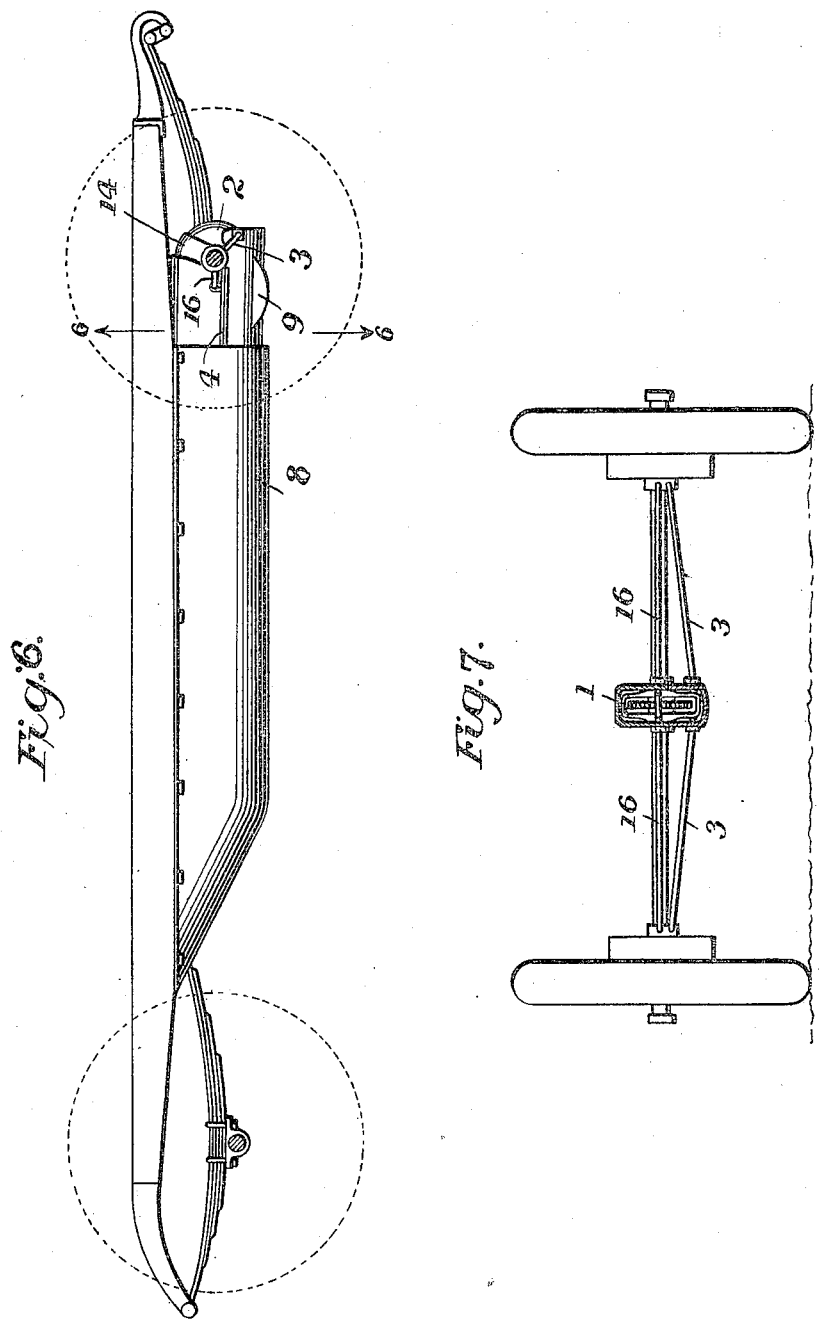

UNITED STATES PATENT OFFICE.

JOHN C. LOTT, OF COLUMBIA, SOUTH CAROLINA.

GEAR-CASING FOR MOTOR-VEHICLES.

935,036.
Specification of Letters Patent.
Patented Sept. 28, 1909.

Application filed June 18, 1908. Serial No. 439,129.

*To all whom it may concern:*

Be it known that I, JOHN C. LOTT, a citizen of the United States, residing at Columbia, in the county of Richland and State of South Carolina, have invented certain new and useful Improvements in Gear-Casings for Motor-Vehicles, of which the following is a specification.

My invention relates to a casing for the exposed parts of the driving gear of motor vehicles, and more particularly to a casing for protecting the driving chain of a motor vehicle which extends from the motor to the rear sprocket wheel.

The object of my invention is to provide a practical, efficient and readily assembled casing which may be applied to forms of motor vehicles now in use, without alteration, and one which will allow for relative movements between the frame and running gear of the vehicle.

A further object is to so construct such a casing that it will be free from rattling when the vehicle is running over rough roads.

The invention will best be understood from the following description, taken in connection with the accompanying drawings in which—

Figure 1 represents a side elevation of part of a motor vehicle showing my casing applied to the same. Fig. 2 is a cross-sectional view of the same taken on the line 2—2 of Fig. 1; Fig. 3 is a cross-sectional view taken on line 3—3 of Fig. 1, and showing the support for the front end of the casing; Fig. 4 is a detail; Fig. 5 is a detail of a modification; Fig. 6 shows part of the running gear and frame of a motor vehicle equipped with the preferred form of my casing; and Fig. 7 is a front elevation of the same showing the truss rods of the rear axle sleeve extending through the walls of the casing.

Referring to the drawings, and first particularly to Fig. 1 thereof, 1 is a spider mounted upon a sleeve on the rear axle, there being one on each side of the sprocket wheel 17, and between the two rear arms of which is carried a sector-shaped shield 2 for protecting the rear of the sprocket; and to the lower arm of which is secured a truss rod 3. The sprocket 17 is driven from any suitable source of power by means of chain 20.

The casing is composed of two parts, being divided longitudinally along the line 4 and the halves are secured together by bolts 18 which pass through flanges thereon. The lower half has an opening, shown in the form of a split bearing 5, for the truss rod 3 upon which it is pivoted; the two parts of the bearing being clamped together on the rod 3 by bolts 19, although the rod may pass through a slot in the casing and be held to the same by a latch; or the casing may be secured to the truss rod or axle by a C or other shaped spring so as to permit relative oscillatory movement between the body and running gear; either of which may be substituted for the bearing shown. By this arrangement it will be seen that by removing bolts 18 and 19 the upper and lower halves of the casing may be removed for inspection or repairs.

The front end of the casing is slidably supported by a saddle or yoke 6, carrying antifrictional rollers 7, and mounted upon the apron 8 carried beneath the frame; but the yoke may be suspended directly from the frame, and the rollers omitted.

The bottom half of the casing is cut away and flanged at its lowest point for some distance, and a downwardly projecting, and preferably crescent shaped, piece 9 riveted on to accommodate the slack in the chain 20 at that point and to act as a reservoir for oil. On each side of the casing and preferably on the lower half is mounted an antifrictional roller 10 which engages one arm of the spider and prevents any rattling of the casing due to lateral play, and at the same time guides the casing in its vertical oscillations. The rollers are mounted, with a certain amount of end play, upon metallic strips riveted to the side of the casing so as to permit a certain amount of spring, but a leaf spring may be interposed between the strip and casing as shown in Fig. 5, or a set screw used to adjust the angle between the two parts.

A spiral spring 11 secured to the upper front end of the casing at one end, and connected to the yoke 6 at the other, holds the casing resiliently in its set position, thus permitting a limited amount of longitudinal and vertical play of the casing when passing over rough roads, and relieving the other parts from strain. This construction also prevents any rattling due to such movement.

A spiral spring 12 is connected to the casing at one end, and to the truss rod 3 at the other, to hold the casing resiliently against the rod in order to avoid rattling.

The upper half of the casing is cut away at 13, short of the upper spider arm, and a piece of leather, canvas, or other flexible material 14 is secured to the casing and extends over the spider in such manner as to form a close telescoping joint with the rear sector-shaped shield. Obviously a piece of sheet metal having a flexible joint with the upper half of the casing may be used, or the casing may be extended and have an anti-friction roller to engage the rear shield or spider.

A slot 15 is cut in each side of the upper half of the casing to permit a second truss rod 16 to pass through; and the slot is closed by two stiff pieces of leather secured to the casing and projecting out at an angle with a vertical opening formed by their meeting faces through which the rod passes, this construction permitting vertical play relative to the rod and excluding the dirt.

Having described my invention, what I claim as new and desire to secure by Letters Patent of the United States is,—

1. In a motor vehicle, the combination with its running gear and frame, of a sprocket wheel mounted on the running gear, a driving chain, a hood or apron open at its rear end and suspended from the frame, a gear casing secured to the running gear at one end and having the other end open and extending into the apron for receiving said driving chain, and means for limiting the lateral play of the casing and guiding it in its vertical oscillations.

2. In a motor vehicle, the combination with its running gear and frame, of a casing for the driving gear having a continuous lower part which is pivoted to one of said members at one end, and slidably supported by the other member at its other end, and an upper part carried by the lower part, whereby the casing may be removed from the vehicle without disturbing any of the vehicle parts.

3. In a motor vehicle, the combination with its running gear and frame, of a gear casing pivotally mounted upon one of said members at one end and making horizontal sliding engagement with a point of support on the other member at its other end to permit relative horizontal movement between said casing and said point of support, and resilient means for pressing said casing against said point of support to maintain said sliding engagement.

4. In a motor vehicle, the combination with its running gear and frame, of a gear casing pivotally mounted upon the running gear at one end and slidably supported from the frame at the other end, means for resiliently holding the casing to its support, and a downwardly projecting part on the lower side of the casing for accommodating the slack of the chain.

5. In a motor vehicle, the combination with its running gear and frame, of a longitudinally divided gear casing having its lower half pivotally mounted upon the running gear at one end, and an anti-friction device supported from the frame for slidably engaging the other end of the casing.

6. In a motor vehicle, the combination with its running gear and frame, of a gear casing pivoted to the running gear at one end and slidably supported from the frame at the other end, and guides acting upon the casing intermediate its supports for limiting the lateral play of the casing and guiding it in its vertical oscillations.

7. In a motor vehicle, the combination with its running gear and frame, of a gear casing pivoted to one of said members at one end and slidably supported from the other member at its other end, a part projecting from one of said members extending into proximity to the sides of said casing, and guide pieces carried by the casing and engaging said projecting part.

8. In a motor vehicle, the combination with its running gear and frame, of a gear casing pivoted to the running gear at one one end and freely supported from the frame at the other end, a projection from the running gear extending within the casing, guide members carried upon the sides of the casing intermediate its ends and engaging said projection for guiding the casing in its vertical oscillations.

9. In a motor vehicle, the combination with its running gear and frame, of a longitudinally split casing pivoted to the running gear at one end and slidably supported from the frame at the other end, a spider mounted on the rear axle and having an arm projecting into the casing, an anti-friction guide member mounted upon the side walls of the lower half of the casing and engaging the spider arm to guide the casing in its vertical oscillations, and means for resiliently holding the forward part of the casing to its support.

10. In a motor vehicle, the combination with its running gear and frame, of a gear casing supported by the running gear at one end and from the frame at its other end to allow for relative movement between the running gear and frame, a truss rod on the running gear passing through the casing, and transverse openings in the walls of the casing through which the truss rod passes.

11. In a motor vehicle, the combination with its running gear and frame, of cross-truss rods on the running gear, a gear casing pivoted upon one of said truss rods at one end and freely supported from the frame at its other end, and vertical transverse openings in the walls of said casing to permit relative play between the other truss rod and casing.

12. In a motor vehicle, the combination with its running gear and frame, of a gear casing secured to the running gear at one end and loosely supported from the frame at the other end to allow relative movement between the casing and frame, and a guide-piece secured to each side wall of the casing for limiting the lateral play of the same and guiding it during its vertical oscillations.

13. In a motor vehicle, the combination with its running gear and frame, of a longitudinally divided gear casing pivoted to the running gear at one end and slidably supported from the frame at the other end, a gear wheel on the rear axle and a shield for the same, a flexible piece secured to the rear of the upper half of the casing and extending over the gear wheel and forming a flexible joint between the rear shield and the upper half of the casing to permit free vertical oscillations of the casing and to exclude the dust therefrom.

14. In a motor vehicle, the combination with its running gear and frame, of a cross truss rod on the running gear, a longitudinally divided gear casing having its lower half pivoted to the truss rod, a yoke carried by an apron suspended from the frame for slidably supporting the front end of the casing, a projecting part from the running gear extending within the casing, resiliently mounted guide members carried by the side walls of the casing for engaging said projecting part, a vertical slot in each of said side walls of the upper part of the casing through which a second truss rod passes, and means for resiliently holding said casing to its front support.

15. In a motor vehicle, the combination with its running gear and frame, of a gear casing, a yoke carried by a part depending from the frame for slidably supporting the front end of the casing, a sprocket wheel secured on the rear axle of the vehicle, a spider mounted adjacent to the sprocket wheel and carrying a shield for the rear of said sprocket wheel, a shield of leather or other flexible material secured to the rear of the upper half of the casing and extending over the spider to form a close-fitting flexible joint between the rear shield and the casing, a truss rod on the running gear passing through the casing, slots in the side walls of the casing through which the rod passes, and a flexible covering for the slots which permits free relative movement between the rod and the casing and excludes dirt from the casing.

16. In a motor vehicle, the combination with its running gear and frame, of a driving gear mounted on the running gear, an open-ended hood or apron secured to the frame, an open-ended longitudinally split gear casing, one part of which is secured to the running gear at one end and slidably supported within the hood or apron at the other end, the other part of said casing extending over said driving gear, and means for removably securing the two parts together whereby they may be independently removed from the vehicle.

17. In a motor vehicle, the combination with its frame, of an axle, a sleeve on the axle, a spider on the sleeve, truss rods extending from the spider to a part on the sleeve, an open-ended gear casing supported at its rear end on the running gear below the axle, the side walls of the casing overlapping with the spider and provided with openings through which the truss rods pass, and means for supporting the front end of the casing from the frame to permit relative movement between the casing and the frame.

18. In a motor vehicle, the combination with its frame and running gear, of a two-part spider supported by the rear axle of the running gear, a shield held by the spider, an open-ended gear casing supported at one end upon the running gear at a point below the axle, means for holding the casing to its point of support, the side walls of the casing overlapping with the spider the overlapping part of the casing being flexible to form a comparatively close joint with the spider, the rear end of the side walls being cut away to form an open-ended recess to accommodate the axle, a driving chain passing through the casing to the rear axle said shield and casing excluding dirt from the chain, and means for supporting the front end of the casing from the frame to permit relative movement between the two.

19. In a motor vehicle, the combination with the frame and running gear, of a two-part spider supported by the rear axle of the running gear, a shield held by the spider, an open-ended gear casing supported at one end upon the running gear, an apron secured to the front of the vehicle and into which the front end of the casing extends, a chain passing from the apron through the casing to the rear axle, truss rods extending from the spider to another part of the running gear, the side walls of the casing overlapping with the spider, the overlapping part of the casing being flexible to form a comparatively close joint with the spider so that the shield, spider and the casing exclude dirt from the chain, said side walls being formed with transverse openings through which the truss rods pass, and means for supporting the front end of the casing from the frame to permit relative movement between the two.

In testimony whereof I have affixed my signature, in presence of two witnesses.

JOHN C. LOTT.

Witnesses:
SAMUEL M. WARD, Jr.,
SPENCER B. PRENTISS.